Patented Jan. 9, 1945

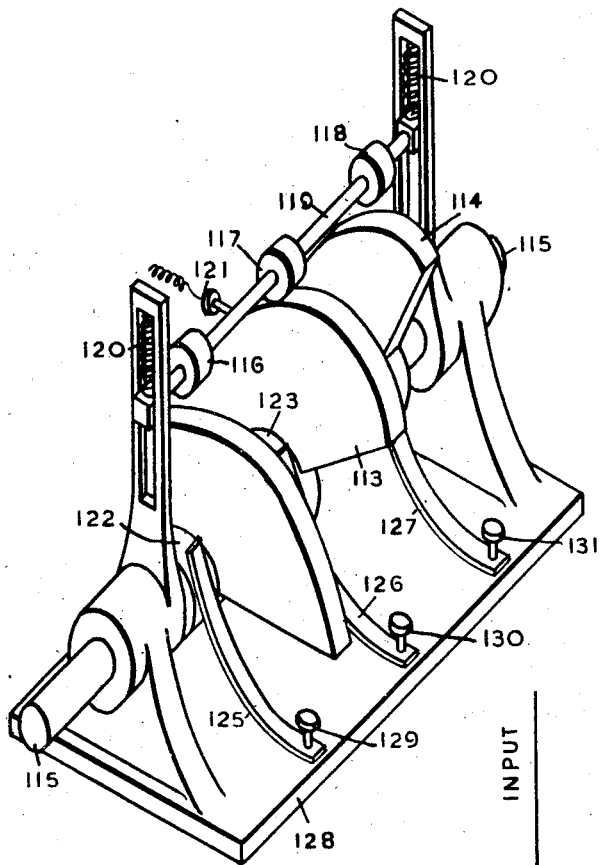
Fig. 11
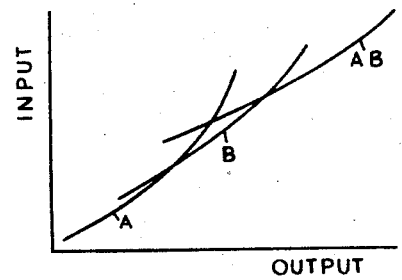
Fig. 10
Fig. 12
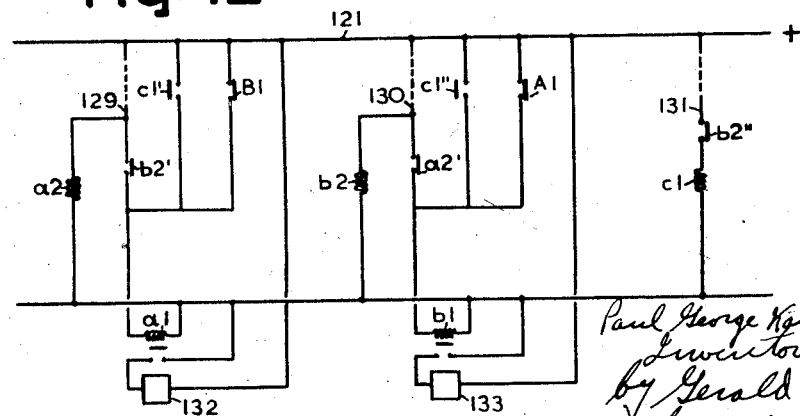

2,366,968

UNITED STATES PATENT OFFICE 2,366,968

CONTROL OF THE LOAD DISTRIBUTION OF A PLURALITY OF GENERATOR UNITS OR OTHER ENERGY TRANSMISSION UNITS SUPPLYING A COMMON LOAD

Paul George Kaufmann, London, England

Application September 2, 1942, Serial No. 457,094
In Great Britain September 3, 1941

35 Claims. (Cl. 290—4)

This invention relates to the control of the load distribution of a plurality of generator units or other energy transmission units supplying a common load.

The primary object of the invention is the provision of means whereby such load distribution may be so controlled that maximum efficiency will be obtained—that is to say, that, for any given total load, the total input, or the sum of the inputs of the several units, will be a minimum.

In accordance with the invention I provide means for either effecting, or indicating, the control of the several units, such that, at any given moment, said units operate on respective points of their characteristic, or load-input, curves which are of the same slope. This is to say, said units operate so that they all require the same change of input for a given change of output.

In some cases where other variables have to be taken account of, the above relationship, viz. that the units operate on points of their characteristic curves which are of the same slope, may be modified in order to compensate for such other variables. An example of this is when a number of electrical power units supplying a common load are interconnected by tie lines, and the loss of energy in said tie lines is such that it ought not to be ignored. The invention has therefore as a further object the provision of means for modifying the said relationship so as to compensate for such other variables.

The invention has for a further object the provision of means for determining how many and which out of a number of units should for best efficiency be in operation for any given total load, the units which are in operation having their loads distributed as above described.

Many other objects and advantages of the invention will appear hereinafter.

It will be appreciated that the variables employed as load and input in the said characteristic curves will depend, even in the same type of unit, on the type of efficiency required. For example, in the case of steam generators, it would usually be a maximum thermal efficiency which is required, and the load and input could be measured in B. t. u. per hour, in the steam generated and in the coal consumed respectively, but, if different kinds of fuel were employed in the several generators, it might be preferred to measure the input in terms of the cost of coal consumed per hour and thus a maximum financial efficiency (but not necessarily a maximum thermal efficiency) would be obtained.

In order that the invention may be the more clearly understood a number of arrangements in accordance therewith will now be described, reference being made to the accompanying drawings, wherein:

Figure 10 is a graph indicating when less than all of a number of power units supplying a common load should be used, for highest efficiency; and Figures 11 and 12 together illustrate an apparatus whereby the indications of the graph of Figure 10 may be implemented.

Figure 1:
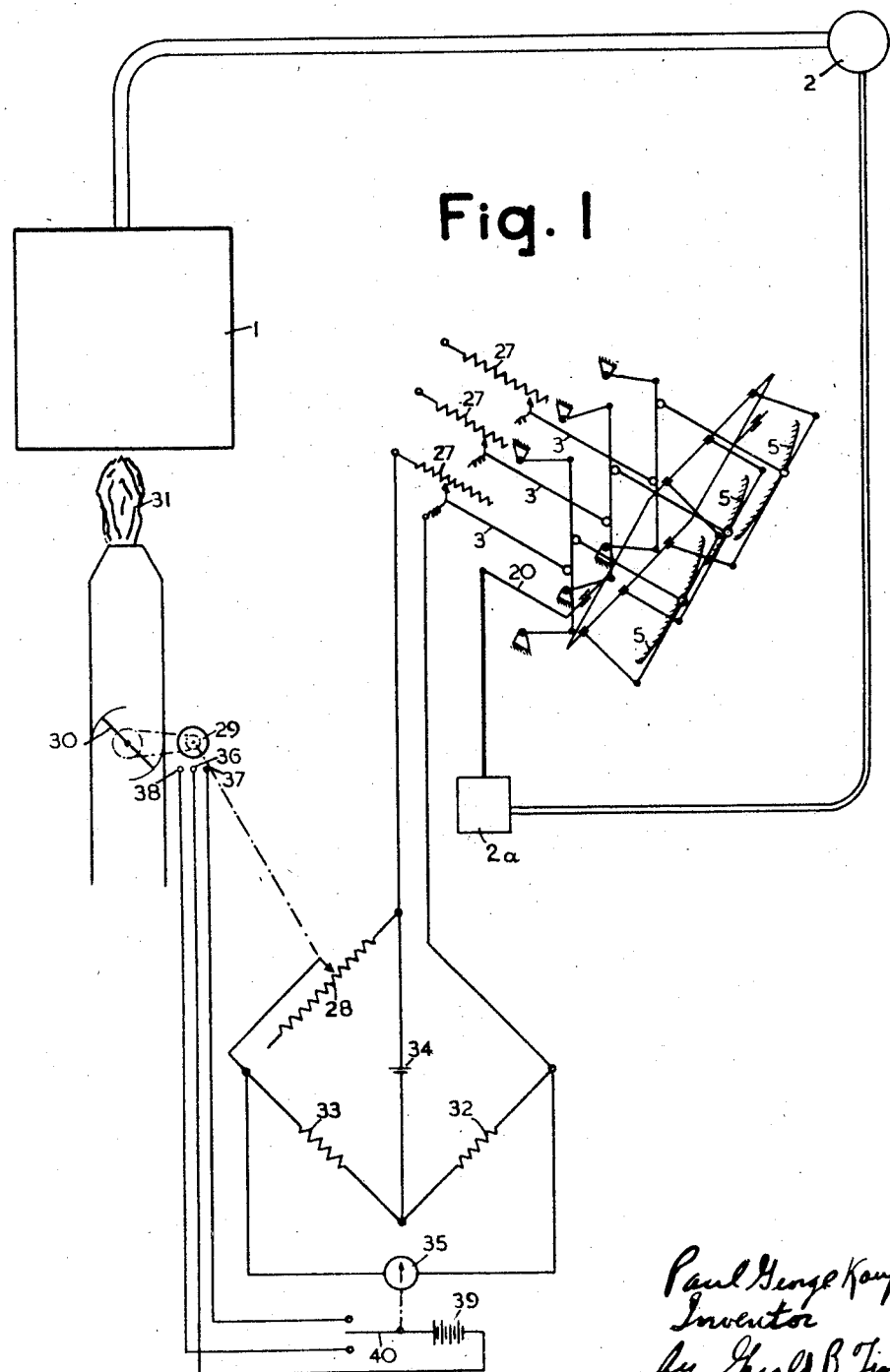
Figure 1 is a somewhat schematic and diagrammatic view of a system in which the invention is applied to the control of load distribution of a plurality of steam generators supplying a common load.
Figure 2:
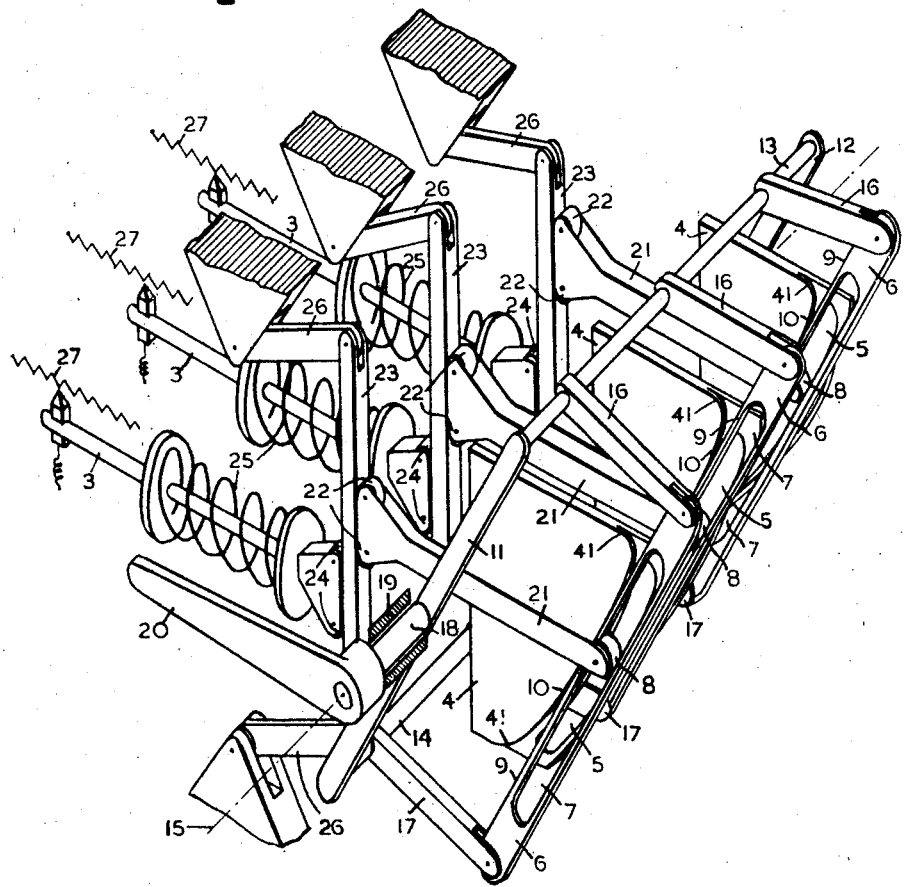
Figure 2 is a perspective view to an enlarged scale of the devices illustrated in Figure 1 for determining the output distribution of the respective steam generators.

Referring first to Figures 1 and 2, a number of steam generators 1 (only one of which is shown) supply a common steam main 2. The inputs to the respective generators 1 are controlled in accordance with the positions of respective longitudinally slidable parallel rods 3. The rods 3 are all moved simultaneously in one or other direction according to the pressure variations in the steam main 2 in such a way that the pressure in said steam main 2 is retained approximately constant at a given value despite variation in the total demand. The means by which the rods 3 are moved in one or other direction to increase and decrease the respective generator inputs are such that the relative positions of said rods 3 and the relative inputs of said generators 1, are always so correlated that the several generators at any given moment, always work on points of their respective input-output characteristic curves which are of the same slope. In other words the generators 1 operate so that they all require the same change of input for a given change of output and in this way it is ensured that the most efficient load distribution of the several generators is obtained.

Referring now more paricularly to Figure 2 which illustrates one means by which the movement of the rods 3 is effected, the same illustrates a number of parallel stationary plates 4 having curved slots 5 formed in them the centre lines of which conform to the characteristic curves of the several generators 1 and are arranged with their output ordinates parallel to the direction of movement of the rods 3. Associated with these plates 4 are a number of elongated plates 6 having rectilinear slots 7 formed in them. Each plate 6 rests flat against the corresponding plate 4. A roller 8 located jointly in each pair of slots 5 and 7 maintains the slots together at one point, and the engagement of a straight edge 9 of each plate 6, which straight edge is parallel to the slot 7 with a curved shoulder 10 formed on the corresponding plate 4, which curved shoulder is parallel to the centre line of slot 5, insures that the centre lines of the rectilinear slots 7 will always be tangential to the centre lines of the respective curved slots 5.

The elongated plates 6 are adapted to be rotated jointly, with their slots 7 remaining parallel to each other, according to variations in pressure of the steam main 2. In so rotating, the slots 7 will be constrained, as stated, to remain tangential to the respective slots 5 and it will be clear that the rollers 8 will be constrained always to take up positions at the respective tangent points. The rods 3 are moved longitudinally according to those components of the movements of the respective rollers 8 which are parallel to the output ordinates of the slots 5 and the actual output of the generators are so correlated to the position of the rods 3 that they are always equal to the outputs indicated by the output ordinates of the respective curves 5 at the points occupied by the rollers 8. It therefore follows that the several generators always work on points of their characteristic curves represented by the points occupied by the rollers 8 in the slots 5, and, as the slots 7 are always tangential to the respective slots 5 at the said points occupied by the rollers 8 and are parallel to each other, the rollers 8 are always at points of the slots 5 which are of the same slope. In other words the generators always operate on points of their characteristic curves which are of the same slope.

The means by which the plates 6 are rotated jointly with their slots remaining parallel to each other comprise a rigid rectangular frame having members 11, 12, 13 and 14 and adapted to be rotated about an axis 15 at right angles to the planes of the plates 4 and passing through the mid points of the opposite members 11 and 12. Each elongated plate 6 is pivoted at one end to one end of a link 16 whose other end is pivoted to the frame member 13 and said plate 6 is pivoted at its other end to one end of a link 17 whose other end is pivoted to the frame member 14. The links 16 and 17 are of the same length and the distance between the frame members 13 and 14 is equal to the length of each plate 6. Thus each plate 6 is constrained always to remain parallel to the plane of the frame 11, 12, 13, 14 while being free to move with its slot 7 tangential to the slot 5 as heretofore described. As all the plates 6 are always parallel to the plane of the frame they are always parallel to each other.

For mounting said frame for rotation about the axis 15, short shafts 18 (only one of which is seen) project rigidly from the mid points of the frame members 11 and 12 and bear on respective bearings 19. The rotation of the frame is effected through the medium of a lever 20 rigidly mounted on one of the shafts 18.

In order to move the rods 3 as stated according to the components of the movements of the rollers 8 parallel to the output ordinates of the slots 5, each roller 8 is mounted at one end of a rod 21 whose orientation is always parallel to the output ordinates of the slot 5 and whose other end has rollers 22 mounted thereon which bear against a bar 23 parallel to the plane of the plate 4 and at right angles to said rod 21 and which is capable of moving in a sense longitudinally of said rod 21 without changing its orientation. The respective rod 3 has rollers 24 mounted at one end thereof which bear against said bar 23 at the side opposite to the rollers 22. The rod 3 is biased by means of a spring 25 so that the rollers 24 press against the bar 23 and this presses the bar 23 against the rollers 22 and thus the longitudinal position of the rod 3 and the rod 21 is determined by that component of the position of the roller 8 which is parallel to the output ordinates of the slot 5. As the roller 8 moves in the slot 5 the rod 21 will move with it but only the component of such movement which is parallel to the output ordinates of the slot 5 will effect movement of the bar 23 and therefore of the rod 3.

It will be appreciated from the drawings that the spacing apart of the rollers 22 is such that the rod 21 automatically remains at right angles to the bar 23 and therefore parallel to the output ordinates of the slot 5. The rods 3 will be mounted for longitudinal movement in bearings not shown.

To enable each bar 23 to have the parallel movement described, it is pivoted at its two ends to the ends of respective links 26 whose other ends are pivoted to fixed points, the links 26 being of equal length and the length of the bar 23 being equal to the distance between the fixed points.

The detailed manner in which the lever 20 is moved in accordance with variations in the pressure within the steam main 2 forms no part of the present invention and it has therefore not been deemed necessary to illustrate this other than diagrammatically. Any known form of control, such as the pressure regulator 2a, can be employed which ensures that the pressure in said steam main 2 remains at approximately the desired value.

Likewise the manner in which the input of each generator 1 is controlled so as to give an output corresponding to the position of the respective rod 3 may be according to any known practice. In the arrangement illustrated in Figure 1 this control is effected electrically through the medium of respective sliding contact rheostats 27 whose sliding contacts are connected to the respective rods 3 so that the resistance of said rheostats vary according to the positions of the rods 3, and therefore represent the desired values of the outputs of the respective generators.

Each rheostat 27 is caused to control the input of the respective generator 1 by being balanced against a rheostat 28 whose resistance is adapted to be automatically varied so as to keep its value equal to that of the rheostat 27 by means of a reversible electric motor 29 which also controls the generator input, represented diagrammatically by the damper 30 controlling the air supply to the furnace 31. Thus the two rheostats 27 and 28 are connected as shown to form adjacent arms of a Wheatstone bridge whose other two arms are constituted by fixed resistances 32 and 33 of equal value. A small source of voltage 34 is connected between the point of junction of the rheostats 27 and 28 and the point of junction of the resistances 32 and 33 and a galvanometer 35 is connected between the remaining two points of junction as shown. The electric motor 29 has three terminals 36, 37 and 38 and is driven in one direction when a source of power 39 is connected across the terminals 36 and 37, and in the other directions when said source of power is connected across the terminals 36 and 38. A switch member 40 is coupled to the needle of the galvanometer 35, and is adapted to connect the source of power 39 across the terminals 36, 37 or 36, 38 according to whether said needle moves in one or other direction from the neutral. When said needle is at the neutral position said motor circuit is broken.

From the above it will be clear that when the two rheostats 27 and 28 have a different value, a potential will exist across the terminals of the galvanometer and the switch member 40 will connect the source of power 39 to the motor 29 to drive it, and therefore the sliding contact of the rheostat 28, in one or other direction. The arrangement is such that said motor is driven in the direction to equalise the value of the rheostat 28 to that of the rheostat 27. Thus the values of said rheostats 27 and 28 will always be equal and the position of the sliding contact of the rheostat 28 (and therefore the position of the damper 30) will be a function of the resistance of said rheostat 27. The rheostat 28 will be so wound that the actual input to the generator will be such as to give the output represented by the position of the rod 3.

At this point it may be mentioned that the slots 5 could have been so located that the rods 3 moved according to the input ordinates and not the load ordinates. This would have meant winding each rheostat 28 so that the actual input to the generator would be that represented by the position of the rod 3. This would appear to be the more logical method as it is actually the input which is controlled, but in this art one usually thinks in terms of generator output and it is therefore preferred to arrange the slots in the manner first described.

It may sometimes happen that the total output reaches a point at which the output required of one (or more) of the generators is beyond either the upper or the lower limit to which the output of said generator is capable of reaching. In this case the most economical arrangement is for the said generator to remain at its maximum or minimum load, the loads of the other generators being distributed as heretofore described. This requirement may be taken care of by arranging that when any roller 8 reaches that end of the respective slot 5 which represents the point of maximum or minimum input and output of the respective generator, the respective elongated plate 6 will be free to continue turning about the roller 8 without its slot 7 being tangent to the slot 5, the roller 8 thus remaining stationary at the end of the slot and the load of the respective generator remaining constant at its maximum or minimum value. In the device illustrated in Figure 2 it will be seen that this is effected by cutting away the curved shoulder 10 at both ends, as at 41, to permit the plate 6 to rotate out of the tangential position as stated.

Figure 3:
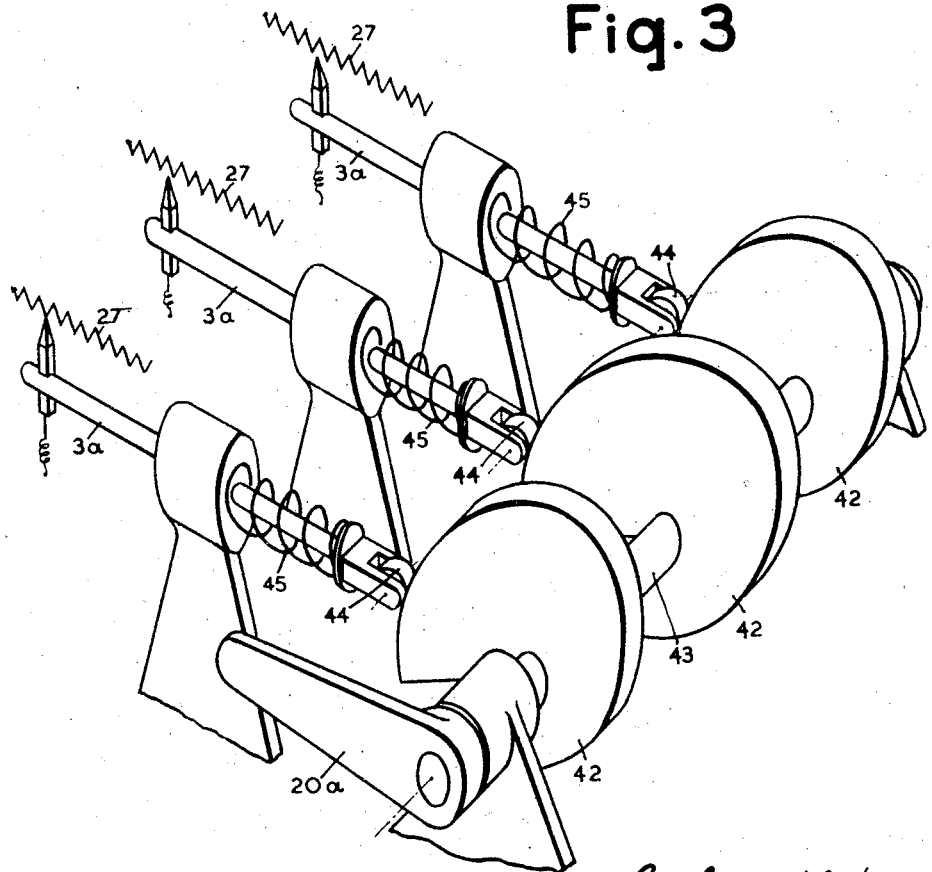
Figure 3 is a perspective view of an alternative form of the devices for determining the output distribution of the respective steam generators.

The above described apparatus is simple and illustrates clearly the theory of the invention. It will be seen that precisely the same control of the respective steam generator inputs can be obtained by the use of simple cams, for example cams of varying radius on a common cam shaft. Such an arrangement is illustrated in Figure 3. This figure shows cams 42 of varying radius mounted on a common cam shaft 43 and engaging at their peripheries with rollers 44 mounted at the ends of longitudinally slidable rods 3a which are radial with respect to the cam shaft and are biased by means of respective springs 45 so that the rollers 44 press against the cam peripheries. The cam shaft 43 has a lever 20a rigidly mounted on it which corresponds to the lever 20 of the preceding embodiment and is actuated in the same manner in accordance with the pressure variation in the steam main 2. The rods 3a correspond with the rods 3 of the preceding embodiment and their longitudinal position controls the inputs to the respective generators through rheostats 27 in the same manner. It will be seen that all that is necessary to obtain exactly the same control as in the preceding embodiment is for the radii of each cam 42 from the axis of the cam shaft 43 to represent the output ordinates (or a definite function of said output ordinates) and the angular positions of said radii around said axis to represent the slopes corresponding to said output ordinates, of the characteristic curve of the respective generator. The angular relation of the cams 42 to each other and to the rollers 44 will of course be such that, at any given time the operative radii of the several cams would all correspond to the same angle about the cam shaft axis, or in other words that the operative load ordinates of the several characteristic curves correspond to a common slope of said characteristic curves. Obviously the simplest way is for the rollers all to be in line as shown and the angles of the radii of the several cams to be measured from the same datum angle.

To take care of the point mentioned in connection with the preceding embodiment, that the total output may reach a point at which the output required of one (or more) of the generators is beyond either limit which the output of said generator is capable of reaching, all that is necessary in the present embodiment is to continue the cam surface at constant radius from the point corresponding to the point of maximum and minimum output of the generator. Further rotation of the cam will thus keep the generator at its said maximum or minimum load, and the condition will be as described in connection with the preceding embodiment.

Figure 4:
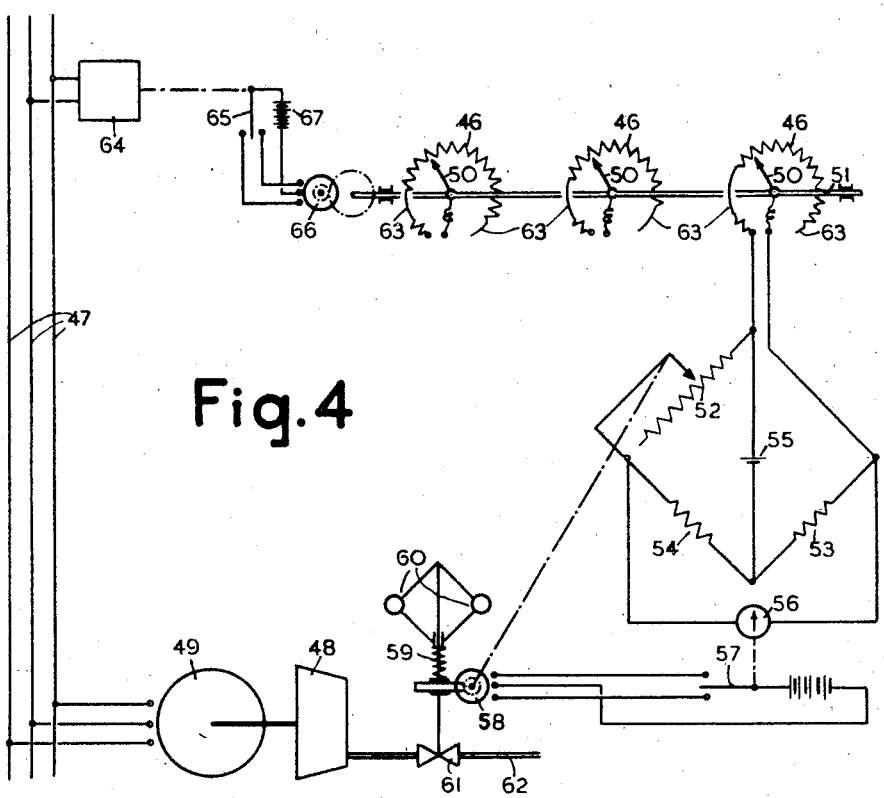
Figure 4 is a schematic and diagrammatic view of a system in which the invention is applied to the control of the load distribution of a plurality of electric generator units supplying a common load.

Referring now to Figure 4 this illustrates an arrangement in which, in place of the co-operating slots of Figure 2 and the cams of Figure 3 variably wound sliding contact rheostats 46 are employed. This figure moreover illustrates the invention as applied to the control of a number of electrical generator sets supplying a common load circuit 47. One of said electrical generator sets comprising a turbine 48 driving an alternator 49 is illustrated. Each of the sliding contact rheostats 46 is so wound that, if the position of its sliding contact 50 represents the slope of the characteristic curve of the respective generator, the resistance of said rheostat is proportional to or is a definite function of the load ordinate of the characteristic curve corresponding to that slope. The sliding contacts 50 are mounted on a common shaft 51 so as to move together with their positions all simultaneously representing the same slope on the respective characteristic curves. The respective resistances of the rheostats 46 therefore represent corresponding values of the loads of the respective generators for the desired load distribution.

The resistance values of the rheostats 46 therefore correspond to the resistance values of the rheostats 27 of Figure 1 and are caused to control the input to the generator units in the same way. Thus each rheostat 46 is connected in a Wheatstone bridge with a rheostat 52 and resistances 53, 54, and said Wheatstone bridge has a source of voltage 55 and a galvanometer 56 connected to it, said galvanometer controlling a switch element 57 to thereby control the energisation for reverse directions of a motor 58. These references 52, 53, 54, 55, 56, 57 and 58 correspond exactly to the references 28, 32, 33, 34, 35, 40 and 29 and no further description is deemed necessary. In the present instance the control of the input of the generator unit by the motor 58 is effected through controlling the compression of the speed adjustment spring 59 of a centrifugal governor 60 which controls a valve 61 in the supply pipe 62 of the turbine 48. In similar manner to Figure 1 each rheostat 52 will be wound to ensure that the generator unit gives the correct output represented by the corresponding resistance 46.

It will be appreciated that as all alternators connected to the same load circuit necessarily run at the same speed the adjustment of spring 59 results in the variation not of the speed but of the output of the respective generating set relative to the other sets.

To take care of the case, referred to in the preceding embodiments, in which the load required by any given unit is greater or less than that which said unit is capable of supplying, each sliding contact 50 when it reaches the extremity of the resistance 46 can continue moving on a segment 63 of zero resistance so that the corresponding generator will remain with its load unchanged at its maximum or minimum value.

Obviously the maximum and minimum resistance of the rheostat 46 and therefore the maximum and minimum output of the corresponding generator set can be made adjustable.

In a manner analogous to Figure 1 the shaft 51 is automatically rotated in reverse directions in such a way as to maintain constant the frequency or some other condition of the load circuit 47. Thus a frequency controller 64, or controller responsive to such other condition, is connected to the load circuit 47 as indicated, and this frequency controller controls a switch 65 in such a way that according as the frequency in the circuit 47 varies in one or other direction from the required frequency, a motor 66 driving the shaft 51 is connected for operation in one or other direction to a source of power 67.

It will be appreciated that, in all of the embodiments hereinbefore described, as the magnitudes representing the slopes of the several characteristic curves are, at any one time, always kept identical for all the units, the actual scale of these magnitudes can be chosen at will without affecting the results. It is therefore possible to use a logarithmic scale for these magnitudes. In the case of the cams 42 illustrated in Figure 3 this would mean that the angular positions of the radii of each cam would vary as the logarithm of the slopes of the characteristic curve of the respective generator corresponding to the output ordinates of said curve represented by said radii. In the case of the rheostats 46 illustrated in Figure 4 it would mean that the longitudinal positions of the sliding contact 50 of each rheostat would vary as the logarithm of the slopes of the characteristic curve of the respective generator unit corresponding to the output ordinates of said curve represented by the resistances of said rheostat at said longitudinal positions.

In some cases the input values for any one generator may be altered in relation to the corresponding output values by being multiplied by a factor K. For example, if the inputs be measured in terms of cost of the fuel and the outputs in terms of B. t. u.'s, and if the price of the fuel of one of the generators were to alter by the factor K, this means that, for each output value the corresponding input value would be altered by the factor K. Accordingly the values of the slopes of the characteristic curve would be effected in the same way, each value of the slope being multiplied by the factor K. If the slopes of the characteristic curve in the cam 42 or rheostat 46 were represented on a linear or any other scale except a logarithmic one, such alteration of the input and slope values would require the replacement of the respective cam or rheostat by a new one. With a logarithmic scale, however, the necessary adjustment can be made simply by rotating the cam 42 around its shaft 43 or by shifting the rheostat 46 about the axis of the shaft 51 by an amount equal to log K.

In order therefore to compensate for such changes of the input values, a logarithmic scale is used for the rheostat slider positions or cam angles representing the characteristic slopes, and means are provided to adjust bodily the relative position of each cam or rheostat with respect to the other cams or rheostats suitable scales being provided indicating various values of the factor K to which such adjustments correspond.

Figure 5:
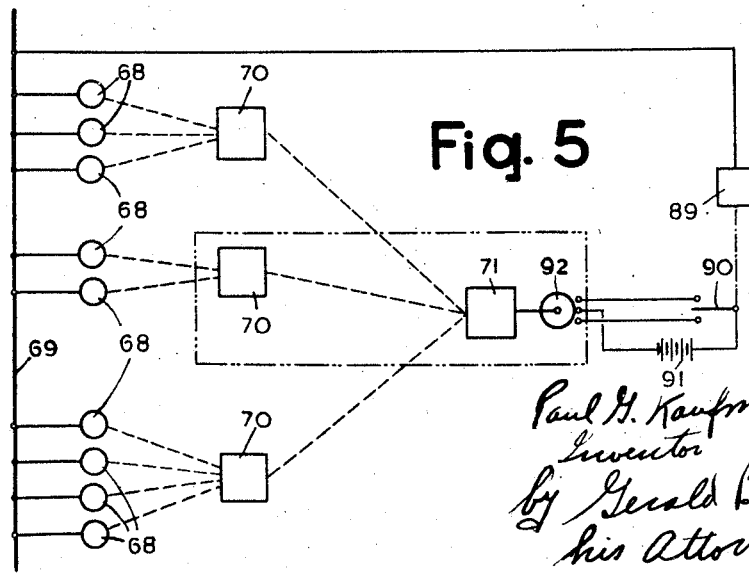
Figure 5 is a schematic view of a system in which the invention is applied to the control of the load distribution of a plurality of electric generator units supplying a common load, and in which the generator units are divided into groups at stations which may be at a considerable distance from one another.

Referring now to Figure 5 this shows, in a schematic manner a system in which a plurality of electrical generator units 68 supply a common load circuit indicated by the line 69 and these generator units are located in groups at a number of different regional stations 70 which are a long distance apart. If the load distribution of all the generator units 68 were controlled in any of the ways heretofore described from a single location, that location would have to be very far distant from most of the generator units, and therefore control circuits from the rheostats 27 or 46 as the case may be to the motors 29 or 58, would have to be very extended. This is inconvenient. For example it renders impracticable the Wheatstone bridge form of control illustrated in Figures 1 and 4. In the arrangement illustrated in Figure 5 therefore the load distribution of the generator units 68 of each group is controlled from its own regional station 70 in the way described, say, in Figure 4 and the load distribution between the several groups is controlled in an analogous manner, from a master control station 71, each group being at the master control station, treated as one unit, and the input-output characteristic of the group as a whole being taken account of at the master control station in determining the correct load distribution between said several groups.

In this way only a limited number of very long control circuits have to be employed, viz. those extending from the master control station 71 to the several regional stations 70.

Figure 6:
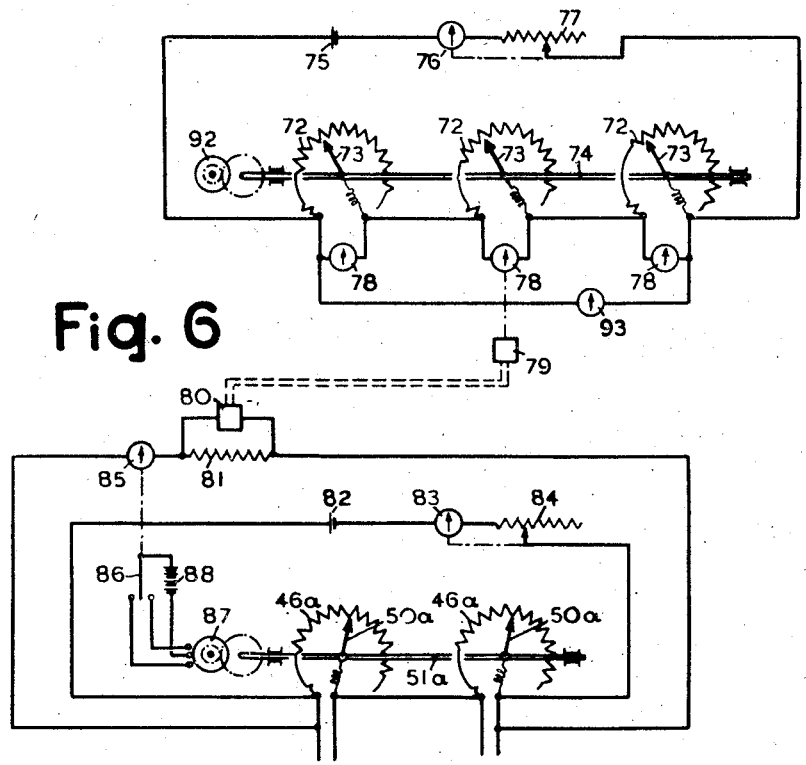
Figure 6 is a circuit diagram illustrating a portion of the system of Figure 5.

Figure 6 illustrates the control circuit from the master control station to one of the regional stations (say the centre regional station of Figure 5 at which there are only two generator units).

Thus referring to Figure 6 there are, at the master control station a plurality of sliding contact rheostats 72 corresponding to the several regional stations i. e. to the groups of generator units, each of said rheostats being so wound that, if the position of its sliding contact 73 represents the slope of the characteristic curve of the respective group of generator units taken as a whole, its resistance is proportional to, or is a definite function of, the load ordinate of the characteristic curve corresponding to that slope. The sliding contacts 73 are mounted on a common shaft 74 so as to move together, with their positions all simultaneously representing the same slope on the respective characteristic curves. The respective resistances of the rheostats 72 therefore represent corresponding values of the loads of the respective groups of generator units, for the desired load distribution, in just the same way as the resistances of the rheostats 46 of Figure 4 represent corresponding values of the loads of the individual generator units 48, 49.

The individual generator units of each group have their load distribution controlled at the respective regional station by sliding contact rheostats 46a having sliding contacts 50a mounted on a shaft 51a in exactly the same way in which the individual units of Figure 4 have their load distribution controlled by sliding contact rheostats 46 having sliding contacts 50 mounted on a shaft 51.

Obviously the input to the group of generator units as a whole is controlled by rotation of the shaft 51a, and it is necessary that this rotation shall be controlled in accordance with the resistance value of the corresponding rheostat 72 at the master control station in such a way that the output of the group as a whole shall correspond to the resistance value of said rheostat 72. This control is effected in the following way:

A small source of power 75 is connected in a series circuit with the several rheostats 72 at the master control station, and, in this circuit, is connected a compensating device for ensuring given constant current despite variation of the resistance values of the several rheostats. Such a compensating device, which is well known, may comprise an ammeter 76 and rheostat 77 in series in the circuit, and means whereby said rheostat 77 increases or decreases its resistance value so long as the ammeter needle reads above or below the said given constant current. Therefore the voltage across each rheostat 72 is a measure of its resistance value. Each rheostat 72 has connected across it a volt meter 78 and the readings of said volt meter are a measure of the resistance value of said rheostat 72. Each volt meter 78 controls a sending device 79 which in turn controls a receiving device 80 at the regional control station in such a way that said receiving device 80 develops the voltage indicated by the volt meter 78 and this voltage is impressed across the ends of a resistance 81. Sending and receiving devices 79 and 80 which function as stated are known in the art and no description of them is deemed necessary.

At the regional control station is a small source of power 82 connected in a series circuit with the several rheostats 46a through a compensating device ensuring given constant current, which compensating device may consist of an ammeter 83 and variable rheostat 84 which operate in the same way as the ammeter 76 and rheostat 77. Therefore the total voltage across the rheostats 46a is proportional to the total resistance of said rheostats and therefore represents the total output allotted to the generator units corresponding to said rheostats, that is, the total output of the group of generators at that station. The shaft 51a is rotated until this voltage is equal to the voltage across the resistance 81 which, as heretofore demonstrated, represents the resistance value of the corresponding rheostat 72 at the master control station.

Thus the resistance of the rheostat 72 will corresponding to the total resistance of the rheostats 46a at the corresponding regional control station and the required condition is accordingly obtained.

For thus rotating the shaft 51a until the total voltage across the rheostats 46a is equal to the voltage across the resistance 81, said resistance 81 is connected, in series with a galvanometer 85, across said rheostats 46a in such a sense that the voltage across it opposes the voltage across said rheostats 46a. When these two opposing voltages therefore are equal, the needle of the galvanometer 85 will register zero, and said needle will move in one or other direction according to whether one or other of said opposing voltages is the greater. Each needle controls a switch member 86 in a manner exactly analogous to the switch member 40 of Figure 1, so that a motor 87 which is coupled to the shaft 51a is driven from a source 88 in one or other direction according to the direction of movement of the needle of the galvanometer 85 so as to equalise the aforesaid two voltages and return said needle to zero when said motor is cut off from said source.

In order that the whole system shall be controlled so that the frequency and therefore the voltage of the load circuit 69 (Figure 5) shall be constant, the shaft 74 of the rheostats at the master control station is rotated in one or other direction when the frequency is above or below the required value, in such a way as to restore said frequency to the required value. To this end a frequency controller 89 (Figure 5) which is connected to the load circuit 69, controls a switch member 90 which in turn controls the connection to a source 91 for reversing motor 92 which drives said shaft 74, the action being exactly the same as that of the corresponding parts 64, 65, 67 and 66 of Figure 4. The references 92 and 74 are shown in both Figures 5 and 6.

As the voltage across each rheostat 72 at the master control station 71 gives a measure of the total output allotted to the several power units 68 at the regional station 70 corresponding to said rheostat 72 the total voltage across the several rheostats 72 will give a measure of the total output required of all the power units 68 in the system. Therefore by connecting a volt meter 93 across all of the rheostats 72 a measure is obtained of the total output of the whole system, required to maintain the frequency at its normal value, which is of course equal to the demand on the whole system. To be aware, at any moment, at the master control station of the total load of the system is a great advantage.

Obviously the cascading system described with reference to Figures 5 and 6, in which the individual generator sets are controlled from regional control stations, which regional control stations are again controlled from a master control station, could be extended indefinitely by interposing stations controlling groups of regional control stations and so on.

Figure 7:
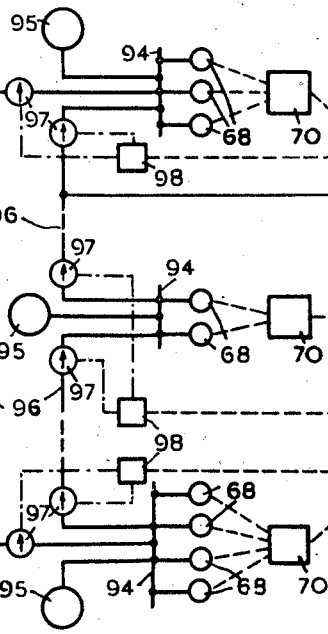
Figure 7 is a schematic view of a system which is similar to that of Figure 5, save that the stations are interconnected and the transmission losses between them are taken account of in determining the load distribution of the generator units.

Referring now to Figure 7 this illustrates schematically an arrangement which is similar to that of Figure 5 save that the groups of power units are interconnected by means of tie bars in which losses take place which cannot be ignored. As in Figure 5 the references 68 designate the power units, the references 70 the regional control stations and the references 71 the master control station. The several power units 68 at each regional control station 70 are connected together by means of a station busbar 94 which serves to supply the regional consumers, indicated diagrammatically at 95, and the several busbars 94 are interconnected by means of tie lines 96.

In order to compensate for the losses in the tie lines 96, each regional control station has a number of wattmeters 97 connected in its respective tie lines 96 close to the busbar 94 of said station. These wattmeters 97 measure the value and direction of the power outgoing from, or incoming to, their respective busbars by the several tie lines. The readings of the several wattmeters 97 appertaining to each bus bar (in the present instance two in number) multiplied by the corresponding tie line coefficient $k$ and the reciprocal value of the square of the $\cos \phi$ of the transmitted power, are totalised and transmitted by a telemeter sender 98 to a telemeter receiver 99 located at the master control station 71. If the power sent out from, or received by, a given busbar 94 by way of any tie line 96 is $\gamma$, taken positive when sent out and negative when received, the sender 98 transmits the value $$\Sigma k\gamma/\cos^2 \phi$$

to the receiver 99. The several receivers 99 influence the distributor at the master control station 71 in a manner which will now be described with reference to Figure 8. Said master load distributor is controlled by a frequency regulator 89 connected to some point of the power network in exactly the same way as the master load distributor of Figure 5 in such a way as to maintain substantially constant the frequency of the load.

Figure 8:
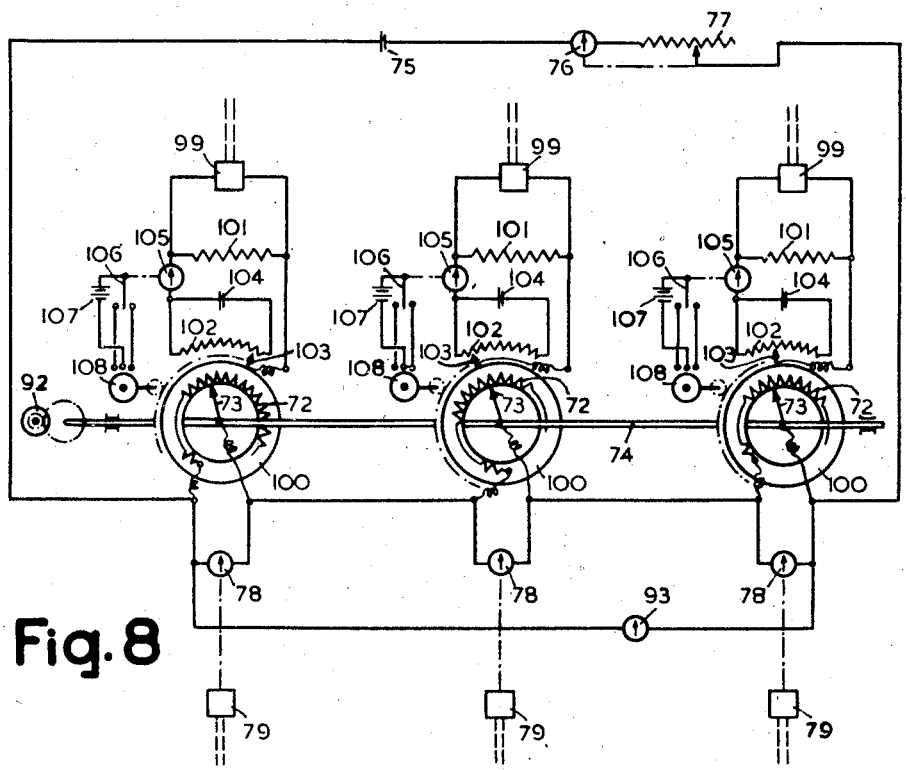
Figure 8 is a circuit diagram illustrating a portion of the system of Figure 7.

Referring now to Figure 8 this illustrates in detail the master load distributor at the master control station 71 of Figure 7. Figure 8 corresponds to the upper part of Figure 6 and shows rheostats 72 having sliding contacts 73 and mounted on a common shaft 74 a source of power 75 and an associated compensating device 76, 77 connected in series with said rheostats, voltmeters 78 connected across said rheostats, and sending device 79 associated with the respective voltmeters 78 each for influencing the load distributor (not shown in Figure 8) at the respective regional control station, all exactly in the manner described in connection with Figure 6. Figure 8 also shows a motor 92 for driving the shaft 74 (under the control of the frequency controller 89) in the same way as described in Figure 6. Also the common voltmeter 93 for indicating at any moment the total load of the system. Figure 8 differs from Figure 6 only in the means for influencing the several rheostats 72 by the respective telemeter receivers 99 (shown in both Figures 7 and 8).

Thus the resistances 72 are wound on a logarithmic scale, as heretofore described, and each resistance 72 is mounted upon a ring 100 which is rotatable so that said resistance is capable of being adjusted about the shaft 74 on which its sliding contact 73 is mounted. When the rings 100 are at their normal or central positions (representing no load on the tie lines 96 of Figure 7) everything is exactly the same as in Figure 6, the positions of the sliding contacts 73 corresponding to equal slope values of the characteristic curves of the groups of power units at the respective regional control stations.

The values received, as heretofore described, by the telemeter receivers 99 are transformed by each of said receivers 99 into a direct current of a magnitude proportional to the value received. Each of these direct currents is passed through a fixed resistance 101, and thus the potential drop across said resistance 101 is proportional to the received value, i. e. $\Sigma k\gamma/\cos^2 \phi$.

A uniformly wound resistance 102 of arcuate form is located adjacent each ring 100 and is engaged by means of a sliding contact 103 mounted on said ring. Said resistance 102 is connected across a source of power 104, and one end of said resistance 102 is connected through a galvanometer 105 to an end of the resistance 101, while the sliding contact 103 is connected to the other end of said resistance 101. The direction of the currents through the resistances 101 and 102 respectively are such that the voltage drop across the resistance 101 is opposed to the voltage drop between the contact 103 and the end of the resistance 102 which is connected through the galvanometer 105 to said resistance 101. If these voltage drops are unequal, the needle of the galvanometer 105 will move in one or other direction from zero and this will move a switch 106 in one or other direction so as to connect across a source of power 107 for movement in one or other direction, a reversing motor 108 which is adapted to drive the ring 100. The arrangement is such that, if the said voltage drops do not balance, the motor 108 will move the ring 100 in such a direction as to cause them to balance.

The arrangement is such that, when no value is received by the telereceiver 99 the voltage drop across the resistance 101 is equal to half that across the resistance 102. Therefore when no value is received by said telemeter receiver 99 the contact 103 will take up a position at the centre of the resistance 102. This is the normal or central position of the ring 100 hereinbefore referred to. For positive values received by said receiver 99 (i. e. when the corresponding station bus bar is sending out power) the voltage drop across the resistance 101 is increased and the contact 103 will therefore move towards the right hand end of the resistance 102 and the resistance value of the rheostat 72 will be diminished, and as the winding of the resistance 102 is uniform the displacement of the ring 100 and resistance 72 will be proportional to the value of $\Sigma k\zeta/\cos^2 \phi$. Obviously for negative values received by the receiver 99 the ring 100 and resistance 72 will be displaced in the opposite, or resistance increasing direction by the said value $\Sigma k\zeta/\cos^2 \phi$. As will have been clear from the description relating to Figure 6 a diminution of the resistance 72 gives a decrease in the power sent out by the group of power units at the corresponding regional control station, and vice versa.

If in the central position of the ring 100 and resistance 72 the position of the contact 73 was $\log_{10} dy/dx$ corresponding to a slope value of $dy/dx$ of the input-output curve of the corresponding group of power units (the scale being based on the basis 10) then after the ring 100 has been rotated by the action of the telemeter receiver 99 the position of the contact 73 will become $\log_{10} dy/dx - C \Sigma k\zeta/\cos^2 \phi$ which, for small values of the second term and choosing the arbitrary constant $C = \log_{10} e = 0.434$, corresponds to a slope value of $$\frac{dy/dx}{1 - \Sigma k\zeta/\cos^2\phi}$$

which is the value required for the slope of the characteristic curve of the respective group of power units in order to obtain the most economic load distribution.

Figure 9:
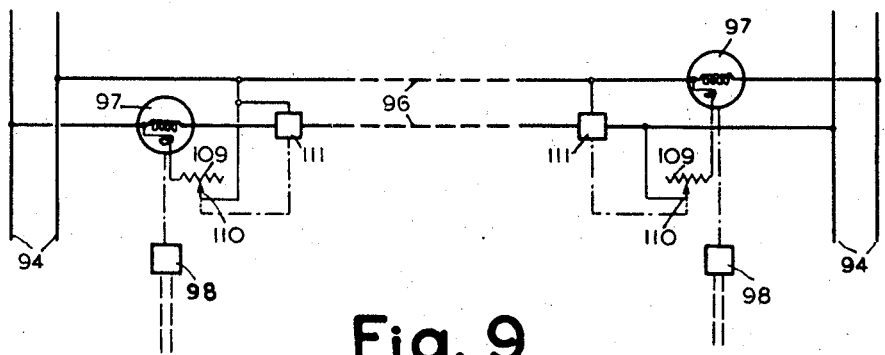
Figure 9 illustrates a modification which may be applied to the system of Figures 7 and 8.

It might happen that a tie line should become overloaded. Figure 9 shows an arrangement whereby such overloading is prevented. Referring to this figure the busbars 94 (corresponding to those of Figure 7) of two regional control stations are shown connected by a tie line 96 (corresponding to those of Figure 7) which for the sake of simplicity is shown as a single phase line. If the power which is required to be transmitted from one busbar to the other by said tie line 96, for the condition of most economic load distribution should be in excess of the capacity of such tie line 96, then the regional power output at one busbar is reduced and that at the other correspondingly increased, to just such an extent as to reduce the actual power transmitted along the tie line 96 to a value which is within the capacity of said tie line. This is done in the following way:

The watt meters 97 (corresponding to the watt meters 97 of Figure 7) have sliding contact rheostats 109 connected in series with their pressure coils as indicated, and the sliding contacts 110 of said rheostats are controlled by means of respective regulators 111 connected in the circuit of the tie line 96. For normal loadings of said tie line 96 the regulators 111 are ineffective and the sliding contacts 110 remain stationary at a given normal position and the wattmeters accordingly indicate the correct power values and the telemeter senders 98 (corresponding to the senders 98 of Figure 7) send the correct values to the telemeter receivers at the master control station (not shown in Figure 9). As soon as the power transmitted along the tie line 96 approaches overload value the regulators 111 commence to move the sliding contacts 110 so as to decrease the resistance of the rheostats 109. This causes the wattmeters 97 to indicate an incorrectly great power transmission, and consequently the senders 98 send an incorrectly great value and the adjustment made to the rings 100 at the master control station (not shown in Figure 9) is incorrectly great. This has the effect as will be clear of reducing the output to the busbar 94 which is transmitting to the tie line 96 and increasing the output to the busbar 94 which is receiving from the tie line 96. The regulators 111 must of course have a certain range so as to be able to adjust the rheostats 109 gradually, and when the load in the tie line 96 begins to drop again the resistance values of the rheostats 109 will again increase, until, when said resistance values reach normal the regulators will cease to function again and the system will be working at the most economic load distribution just as in Figures 7 and 8.

The same rheostats 109 can be employed to make the manual adjustment to allow for varying value of $\cos^2 \phi$.

Obviously these adjustments, instead of being made to the circuits of the pressure coils of the wattmeters could be made at some point between said wattmeters 97 and the senders 98. This would have the advantage that the wattmeters would always indicate the correct values.

In the various embodiments of the invention heretofore described in the preceding description, the most efficient load distribution between a number of energy transmission units supplying a common load is obtained. This, however, presupposes that all the units are in use. The principle heretofore described, that the units should all work on points of their characteristic curves which are of the same slope, cannot be used to determine how many and which units ought to be employed for greatest efficiency for any given total load, because the said principle ignores the relative positions of the several characteristic curves, or, what amounts to the same thing, it does not take into account the no-load input required. It might well be, particularly when the load varies over a wide range, that, for different loads, better efficiency is obtained if different selections of less than all of the units are employed, the remainder being cut out altogether. In Figures 10, 11 and 12 means are described for automatically determining which units are to be employed for maximum efficiency for any given total load.

It will be appreciated that, for a given number $n$ of units, the number of possible combinations which may be employed is $2^n - 1$. For example if there are three units $a$, $b$ and $c$ the number of possible combinations will be $2^3 - 1 = 7$. These combinations may, for the sake of clarity, be set out as follows: $a$ alone, $b$ alone, $c$ alone, $a+b$, $a+c$, $b+c$, and $a+b+c$.

If now the $2^n - 1$ characteristic curves (i. e. input-load curves) of the total possible combinations of units are plotted on one sheet, these curves will together build up a single enveloping curve which will be the curve of maximum efficiency for the whole set of units and will show which combination should be worked on for maximum efficiency for any given total load.

In calculating the characteristic curves for the different combinations of units, the units of the combinations are of course assumed to have their loads distributed according to maximum efficiency. That is they are assumed to work as described in the various preceding examples, on points of their individual characteristic curves which are of the same slope.

Figure 10 illustrates a simple example in which the total number of units is two, hereinafter referred to as $a$ and $b$ but not illustrated. In this case the number of characteristic curves to be plotted will be $2^2 - 1 = 3$ viz. one for the unit $a$ one for the unit $b$ and one for the combination $ab$. In Figure 10 the curve A is the characteristic curve for the unit $a$; the curve B is the characteristic curve for the unit $b$, and the curve AB is the characteristic curve for the units $a$ and $b$ together. It will be seen that these curves together build up an enveloping curve which consists partly of the curve A, partly of the curve B and partly of the curve AB. This curve is to be worked on for best efficiency. For certain output values, the part of the enveloping curve to be worked on is the part consisting of A alone, and this means that for these output values the unit $a$ should be employed alone. For other output values the part of the enveloping curve to be worked on its the part consisting of B alone, means that for such output values the unit $b$ alone should be employed, and for other output values, the part of the enveloping curve to be worked on its the part AB means that for such output values both units $a$ and $b$ should be employed together. Of course it might be found that the curve A or the curve B never appeared on the enveloping curve at all and this would simply mean that the unit $a$ or the unit $b$ are never to be used alone. In like manner, in larger installations, there might be many combinations of units whose curves would never appear on the enveloping curve and which would therefore never be required.

A simple way to effect practical control of the cutting in and out of the units according to the requirements indicated by Figure 10 is illustrated in Figure 11. In this figure three cams 112, 113, and 114 corresponding respectively to the three curves A, B and AB are mounted on a common rotatable cam shaft 115. Thus the angular positions of the radii of each cam represents the load ordinates of the respective characteristic curve, and the radii themselves represent negatively the input ordinates of said curve. By the expression "negatively" it is to be understood that, the less the input ordinate the greater the radius. It will be seen that the profile of this combination of cams, looked at in a direction axially of the shaft, will represent the aforesaid enveloping curve, each cam portion which, for any given angular range, has the greatest radius of the set, forming part of said enveloping curve.

The three cams have associated rollers 116, 117 and 118 mounted on a common bar 119 parallel to the cam shaft 115 and which while remaining parallel to said cam shaft 113, is capable of moving in a plain which is radial with respect to said cam shaft. This bar 119 is biased by means of springs 120 towards the cam shaft 115 and it will be seen that said shaft will come to rest with one of the rollers engaging with its respective cam. The cam shaft 115 is rotated in accordance with the total load, according to the same scale which determines the angular positon of the cam radii and it will therefore be seen that, assuming the angular positon of the radial plane of reciprocation of the bar 119 to be correctly located, for any given load, whichever roller is in contact with its respective cam determines which unit or combination of units is to be worked. In Figure 11 for example the angular position of the cam shaft 115 is such that the roller 117 is in engagement with its cam 113 and this shows that for the total load represented by the said angular position the unit $b$ alone should be worked.

As stated the angular position of the cam shaft 115 is adjusted automatically in accordance with the total load. The units are also cut in and out automatically according to the requirements indicated. This is done electrically in the following manner:

The bar 119 and its rollers 116, 117 and 118 are of metal and said shaft has a common terminal 121 mounted on it. The cams 112, 113 and 114 are also of metal but they are insulated from each other. Such cams are formed with respective associated bosses 122, 123 and 124 (not seen) and respective leaf spring contacts 125, 126, and 127 engage with the peripheries of these bosses. These leaf spring contacts are mounted on a common insulating base 128 for the whole structure and have associated terminals 129, 130 and 131.

It wil be seen that when the unit $a$ alone is required, electrical connection will be established from the terminal 121 to the terminal 129 said connection being by way of the shaft 119 the roller 116 the cam 112 the boss 122 and the leaf spring contact 125. In similar manner when unit $b$ alone is required, connection is established from said terminal 121 to the terminal 130 and when units $a$ and $b$ are required together, connection is established from said terminal 121 to the terminal 131.

Referring now to Figure 12 the references 132, 133 designate automatic starters for the units $a$ and $b$ respectively. Each of these starters when energised does everything necessary to start its respective unit, and, when de-energised to stop its respective unit. The energisation of these starters is controlled by means of relays $a1$, $b1$ having normally open contacts as will be clear from the diagram.

The references A1 B1 designate normally closed contacts which are operated by the respective units $a$ and $b$ in such a way that they open when the respective units are in full operation.

The references $a2$, $b2$ designate respective relay windings. The winding $a2$ has normally closed contacts $a2^1$ and the winding $b2$ has normally closed contacts $b2^1$ and $b2^{11}$.

The reference $c1$ designates the winding of a relay having normally open contacts $c1^1$ and $c1^{11}$.

Figure 12 also shows the terminals 121, 129, 130 and 131 of the preceding figure.

Assuming that the roller 116 is in engagement with its cam 112 so that terminal 121 is connected to terminal 129, and that only the unit $a$ is in operation, the condition will be that the contact B1 will be closed and the winding $a1$ accordingly energised, and the starter 132 energised for operating the unit $a$. The winding $a2$ will also be energised causing the contacts $a2^1$ to open but this will be for the moment without effect as the terminals 130 and 121 are disconnected. As the winding $b2$ is de-energised the contacts $b2^1$ and $b2^{11}$ are both closed but without effect as the contacts $b2^1$ only parallel the contacts B1, and the contacts $b2^{11}$ cannot establish the circuit of C1 as the terminals 121 and 131 are disconnected.

If now the total load increases until the point is reached where the rollers 116 and 117 are both in engagement with their respective cams so that the terminal 121 is connected simultaneously to both terminals 129 and 130 the relay winding $b2$ will be energised, and the contacts $b2^1$ and $b2^{11}$ will open, but this will be for the moment without effect, and the unit $a$ alone will accordingly remain in operation.

If now the total load is increased further so that the roller 116 disengages the cam 112 the roller 117 remaining in engagement with the cam 113 the terminal 129 will be disconnected from the terminal 121 and the winding $a2$ will be de-energised, causing the contacts $a2^1$ to close. The winding $b1$ will accordingly be energised, energising in turn the starter 133 and starting the unit $b$. The unit $a$ will, however, continue operating for a short time until the unit $b$ is fully in operation whereupon the contact $b1$ will open and the winding $a1$ will be de-energized, thereby de-energising the starter 132 and putting the unit $a$ out of operation. The unit $b$ alone will now be in operation. Also the contact A1 will close affording an alternative path of energisation for winding $b1$.

If now the total load is increased still further so that the rollers 117 and 118 both engage their respective cams, and the terminals 130 and 131 are both connected to the terminal 121 nothing further will take place because the contacts $b2^{11}$ are open as heretofore stated. The unit $b$ therefore remains alone in operation.

If now the total load increases still further so that the roller 117 disengages the cam 113, the roller 118 remaining in engagement with the cam 114 the terminals 121 and 130 are disconnected from each other and the relay winding $b2$ is de-energised thereby closing the contacts $b2^1$ and $b2^{11}$. Closing of contacts $b2^1$ will be without effect; closing of contacts $b2^{11}$ will effect energisation of the winding $c1$ and consequent closing of the contacts $c1^1$ and $c1^{11}$. The winding $a1$ will accordingly be energised and the unit $a$ put into operation. The contacts A1 will now open, but the winding $b1$ will remain energised through the contacts $c1^{11}$. Both units $a$ and $b$ will therefore now be in operation.

If now the total load decreases, so that, once again, the rollers 117 and 118 both engage their respective cams, and the terminals 130 and 131 are both connected to the terminal 121, the winding $b2$ will be energised thereby opening the contacts $b2^{11}$ and de-energising the winding $c1$. The contacts $c1^1$ and $c1^{11}$ will accordingly both open. Opening of contact $c1^1$ will de-energise winding $a1$ and put the unit $a$ out of operation, but the opening of contacts $c1^{11}$ will not de-energise the winding $b1$ because the contacts $a2^1$ are closed as the winding $a2$ is de-energised. The unit $b$ will accordingly alone remain in operation. Owing to the unit $a$ ceasing to operate, the contacts $a1$ will close affording an alternative path of energisation for winding $b1$.

Since the $a$ and $b$ circuits are symmetrical with respect to one another, the operation, as the total load continues to decrease, will be exactly the converse, in changing from the unit $b$ alone to the unit $a$ alone, to the heretofore described operation in changing from the unit $a$ alone to the unit $b$ alone when the total load was increasing. Further description is therefore not deemed necessary.

It will be clear that, in all of the arrangements heretofore described except Figures 7, 8 and 9, the controlling mechanism instead of actually controlling the load distribution of the several power units, could be used to indicate the required load distribution of said power units. Thus the rods 3 of Figure 1 or sliding contacts 50 of Figure 4 or the windings $a1$, $b1$ of Figure 12 instead of actually controlling the respective power unit could operate an indicating device which would indicate the control of the respective power unit required, the said control being afterwards effected by hand.

Further the whole control system could be physically disassociated from the comon load and the adjustment of the handle 20 in the case of Figures 1 and 2 or the handle 20a in the case of Figure 3 or the shaft 51 in the case of Figure 4 or the shaft 74 in the case of Figures 5 and 6 or the shaft 115 of Figure 11 could be adjusted by hand in accordance with the total output required or the frequency as the case may be. Those of the appended claims which relate to any of Figures 1 to 6 or 10 to 12 are deemed to cover such arrangements.

In the case, however, of Figures 7, 8 and 9 this is not possible, as the modification of the load distributor in accordance with tie line losses depends on reaction within the net work itself. If in this case, an indicating, instead of an actual controlling device is required, this could only be done by employing an electrical model of the actual network.

By impressing on the circuits representing the stations, regional costumers, and tie-lines, potentials or phase angles proportional to the allocated output, the resulting potential or phase differences will cause currents to flow between the points representing the several stations. These currents which are analogous to the energy flow in the actual network may then be used to shift the several rheostats of the indicating device as described in the specification. Those of the appended claims which relate to Figure 7, 8 or 9 are deemed to cover such an arrangement.

It will be appreciated that the invention is not confined to the control of steam generators and electrical power generators. The invention can be applied to any units of similar or dissimilar character operating in parallel if their inputs and outputs can be expressed in the same terms respectively. The invention can, for example, be applied to the parallel operation of different power stations, either thermal or hydraulic or both, or to pump works, grinding mills, steam engines, etc. etc. or indeed to plants outside the sphere of engineering.

What I claim and desire to secure by Letters Patent is:

1. A system of control of the load distribution of a plurality of energy-transmission units supplying a given system, comprising a common element, means for actuating said common element in accordance with a condition of the said system, individual controlling devices for effecting the control of the several units, means whereby said controlling devices are actuated jointly by said common element in such a way that said condition is regulated and said units operate to give maximum combined output relative to their combined input, said means being provided with elements shaped in accordance with the logarithms of the slopes of the input-output curves of the several energy-transmission units whereby the input values of any one of said energy-transmission units in relation to their respective output values may be modified in accordance with the logarithm of a predetermined factor K.

2. A system of control of the load distribution of a plurality of energy-transmission units supplying a given system, comprising a common element, means for actuating said common element in accordance with a condition of the said system, individual controlling devices for effecting the control of the several units and means whereby said controlling devices are actuated jointly by said common element in accordance with the logarithms of the slopes of the input-output characteristic curves of the several units so that said condition is regulated and said units operate at points on their input-output characteristic curves where the logarithms of the slopes are equal.

3. A system of control of the load distribution of a plurality of energy-transmission units supplying a given system, comprising a common element, means for actuating said common element in accordance with a condition of the said system, individual controlling devices for effecting control of the several units, and means whereby each of said controlling devices are actuated jointly by said common element in accordance with the logarithms of the slopes of the input-output characteristic curves of the respective units so as to tend to maintain said conditions constant, while, at the same time, said units operate to give maximum combined output relative to their combined input.

4. A system of control of the load distribution of a plurality of energy-transmission units supplying a given system, comprising a common element, means for actuating said common element in accordance with a condition of the said system, individual transmission devices actuated jointly by said common element for effecting control of the inputs of the several units solely in accordance with the position of said common element in such a sense as to regulate said condition, said transmission devices being so formed and correlated that said units operate to control said energy-transmission units in accordance with and at equal values of the logarithms of the slopes of the input-output characteristic curves of the respective energy-transmission units.

5. A system of control of the load distribution of a plurality of energy-transmission units supplying a given system, comprising a plurality of parts formed to represent the input-output characteristic curves of the respective units, a plurality of parts formed to represent straight lines, means for correlating the second named parts respectively to the first named parts in such a way that the straight lines of said second named parts are always tangent to the curves of the first named parts, means for coupling said second named parts together in such a way that their straight lines always remain parallel to each other, means for jointly rotating said second named parts relatively to said first named parts in accordance with variations in a condition of said system, controlling parts movable in accordance with the components of the movements of the respective tangent points of the curves of the first named parts and the straight lines of the second named parts, which components are parallel to ordinates of said curves of the first named parts, and means for controlling the inputs of the respective units in accordance with the movements of said controlling parts in such a way as to regulate said condition and to cause the respective units to work on points of their characteristic curves corresponding to the said tangent points of the curves of the first named parts and the straight lines of the second named parts.

6. A system of control of the load distribution of a plurality of energy transmission units supplying a given system, comprising a plurality of parts formed with slots representative of the input-output characteristic curves of the respective units, a plurality of parts formed with straight-line slots, a roller engaging jointly in the slots of each corresponding curved and straight-line pair, and co-engaging curved and straight-line surfaces of each corresponding pair of first named and second named parts, which, together with said roller, ensure that the straight-line slot is always tangent to the curved slot at the point occupied by said roller, means for coupling the second named parts together, in such a way that their straight-line slots always remain parallel to each other, means for jointly rotating said second named parts relative to said first named parts in accordance with variations in a condition of said system, controlling parts movable in accordance with components of the movements of the respective rollers, which components are parallel to ordinates of said curved slots, and means for controlling the inputs of the respective units in accordance with the movements of said controlling parts in such a way as to regulate said condition and to cause the respective units to work on points of their characteristic curves corresponding to the positions of said rollers on said curved slots.

7. A system of control of the load distribution of a plurality of energy-transmission units supplying a given system, comprising a common element, means for actuating said common element in accordance with a condition of the said system, individual controlling devices for effecting the control of the several units and means whereby said controlling devices are actuated jointly by said common element in such a way that said condition is regulated and said units normally all operate on points of their input-output characteristic curves which are of the same slope, but that if the demand increases (or decreases) when any unit is already operating at maximum (or minimum) load, said unit remains at its maximum (or minimum) load and the remaining units operate on points of their input-output characteristic curves which are of the same slope.

8. A system of control of the load distribution of a plurality of energy transmission units supplying a given system, comprising a plurality of parts formed to represent the input-output characteristic curves of the respective units, a plurality of parts formed to represent straight lines, means for correlating the second named parts respectively to the first named parts in such a way that the straight lines of said second named parts are always tangent to the curves of the first named parts save when any straight line touches the extreme point of the corresponding curve when it is capable of rotating about said extreme point, means for coupling said second named parts together in such a way that their straight lines always remain parallel to each other, means for jointly rotating said second-named parts relatively to said first named parts in accordance with variations in a condition of said system, controlling parts movable in accordance with the components of the movements of the respective points of contact of the curves of the first named parts and the straight lines of the second named parts, which components are parallel to ordinates of said curves of the first named parts, and means for controlling the inputs of the respective units in accordance with the movements of said controlling parts in such a way as to regulate said condition and to cause the respective units to work on points of their characteristic curves corresponding to the said points of contact of the curves of the first named parts and the straight lines of the second named parts.

9. A system of control of the load distribution of a plurality of energy-transmission units supplying a given system, comprising a plurality of parts formed with slots representative of the input-output characteristic curves of the respective units, a plurality of parts formed with straight-line slots, a roller engaging jointly in the slots of each corresponding curved and straight-line pair, and co-engaging curved and straight-line surfaces of each corresponding pair of first named and second named parts, which, together with said roller, ensure that the straight-line slot is always tangent to the curved slot at the point occupied by said roller, save when any straight-line slot touches the extreme point of the corresponding curved slot when it is capable of rotating about the corresponding roller at said extreme point, means for coupling the second named parts together in such a way that their straight-line slots always remain parallel to each other, means for jointly rotating said second named parts relative to said first named parts in accordance with variations in a condition of said system, controlling parts movable in accordance with components of the movements of the respective rollers, which components are parallel to ordinates of said curved slots, and means for controlling the inputs of the respective units in accordance with the movements of said controlling parts in such a way as to regulate said condition and to cause the respective units to work on points of their characteristic curves corresponding to the positions of said rollers on said curved slots.

10. A system of control of the load distribution of a plurality of energy-transmission units supplying a given system, comprising a common element, means for actuating said common element in accordance with a condition of the said system, and individual cam transmission devices actuated jointly by said common element for effecting control of the inputs of the several units solely in accordance with the position of said common element in such a sense as to regulate said condition, said transmission devices being so formed and correlated that said units operate to control said energy-transmission units in accordance with and at equal values of the logarithms of the slopes of the input-output characteristic curves of the respective energy-transmission units.

11. A system of control of the load distribution of a plurality of energy-transmission units supplying a given system, comprising a common cam shaft, means for rotating said cam shaft in accordance with a condition of said system, individual cams mounted on said cam shaft, the radii of each cam representing ordinates, and the angular positions of said radii representing the slopes corresponding to said ordinates, of the input-output characteristic curve of the respective unit, respective controlling parts engaging with, and movable by, the peripheries of said cams as the cam shaft rotates, and means for controlling the inputs of the respective units in accordance with the movements of said controlling parts in such a way as to regulate said condition and to cause the respective units to be regulated in accordance with equal logarithms of the slopes of the input-output characteristic curves of the respective units.

12. A system of control of the load distribution of a plurality of energy-transmission units supplying a given system, comprising a common cam shaft, means for rotating said cam shaft in accordance with a condition of said system, individual cams mounted on said cam shaft, said cams being so shaped as to correspond to and be in accordance with the logarithms of the slopes of the input-output characteristics of the respective energy-transmission units, and the radii of certain of said cams from a point representing an extremity of the respective input-output characteristic curve remaining constant, respective controlling parts engaging with, and movable by, the peripheries of said cams as the cam shaft rotates, and means for controlling the inputs of the respective units in accordance with the movements of said controlling parts in such a way as to regulate said condition and to cause the respective units to work on points of their characteristic curves corresponding to the points of contact of said controlling parts with the peripheries of said cams.

13. A system of control of the load distribution of a plurality of steam generators supplying a common supply pipe, comprising a common element, means for actuating said common element in accordance with the pressure in said common supply pipe, individual controlling devices for effecting the control of the several steam generators and means for actuating said controlling devices whereby they are actuated jointly by said common element in such a way that the pressure in said common supply pipe is regulated and said steam generators operate to give maximum combined output relative to their combined input in accordance with equal logarithmic values of the slopes of the input-output characteristic curves of said individual generators.

14. A system of control of the load distribution of a plurality of electrical generator sets supplying a common system, comprising a common element, means for actuating said common element in accordance with the frequency in said common system, individual controlling devices for effecting the control of the several electrical generator sets in accordance with the logarithm of the slopes of the input-output characteristic curves thereof, and means whereby said controlling devices are actuated jointly by said common element in such a way that the frequency in said common system is regulated and said electric generator sets operate to give maximum combined output relative to their combined input.

15. A system of control of the load distribution of a plurality of energy-transmission units supplying a common system, comprising a common element, means for actuating said common element in accordance with a condition of said system, a plurality of sliding contact rheostats each so wound that, if the position of its sliding contact represents the logarithm of the slope of the input-output characteristic curve of the respective energy-transmission unit, the resistance of said rheostat is a function of said logarithm of the slope of said characteristic curve, means for actuating said sliding contacts jointly by said common element in such a way that the logarithms represented by the positions of said sliding contacts are always the same and means for controlling the inputs of said energy-transmission units according to the resistances of the respective rheostats in such a way as to regulate said condition and to cause the respective units to work on points of their characteristic curves corresponding to the positions of the respective sliding contacts.

16. A system of control of the load distribution of a plurality of energy-transmission units supplying a common system, comprising a plurality of sliding contact rheostats each so wound that, if the position of its sliding contact represents the slope of the input-output characteristic curve of the respective energy-transmission unit, the resistance of said rheostat is a function of an ordinate of said characteristic curve corresponding to said slope, a common shaft on which said sliding contacts are mounted, the slopes represented by the position of said sliding contacts being always the same, means for rotating said common shaft in accordance with a condition of said system and means for controlling the inputs of said energy-transmission units according to the resistances of the respective rheostats in such a way as to regulate said condition and to cause the respective units to work on points of their characteristic curves corresponding to the positions of the respective sliding contacts.

17. A system of control of the load distribution of a plurality of energy-transmission units supplying a common system, comprising a common element, means for actuating said common element in accordance with a condition of said system, a plurality of sliding contact rheostats each so wound that, if the position of its sliding contact represents the slope of the input-output characteristic curve of the respective energy-transmission unit, the resistance of said rheostat is a function of an ordinate of said characteristic curve corresponding to said slope, means for actuating said sliding contacts jointly by said common element in such a way that the slopes represented by the positions of said sliding contacts are always the same, means for controlling the inputs of said energy-transmission units according to the resistances of the respective rheostats in such a way as to regulate said condition and to cause the respective units to work on points of their characteristic curves corresponding to the positions of the respective sliding contacts and means whereby, when certain of said sliding contacts is moved beyond the point of its resistance representing an extremity of the input-output characteristic curve the value of said resistance remains constant.

18. A system of control of the load distribution of a plurality of energy-transmission units supplying a given system, comprising a common element, means for actuating said common element in accordance with a condition of the said system, individual transmission devices actuated jointly by said common element for effecting control of the inputs of the several units in accordance with the position of said common element in such a sense as to regulate said condition, the movement of said transmission devices at their input ends representing the slopes of the characteristic curves of the respective units according to a logarithmic scale, and the movements of said transmission devices at their output ends representing ordinates of said characteristic curves corresponding to said slopes, and the joint movement of said transmission devices at their input ends being such as to correspond to the same slope for all the devices, and means whereby the inputs of said units are controlled by the movements of said transmission devices at their output ends in such a way as to ensure that said units shall operate on points of their characteristic curves represented by the positions of the respective transmission devices.

19. A system of control of the load distribution of a plurality of energy-transmission units supplying a given system, comprising a common cam shaft, means for rotating said cam shaft in accordance with a condition of said system, individual cams mounted on said cam shaft, the radii of each cam representing ordinates, and the angular positions of said radii being proportional to the logarithms of the slopes corresponding to said ordinates, of the input-output characteristic curve of the respective unit, respective controlling parts engaging with, and movable by, the peripheries of said cams as the cam shaft rotates, and means for controlling the inputs of the respective units in accordance with the movements of said controlling parts in such a way as to regulate said condition and to cause the respective units to work on points of their characteristic curves corresponding to the points of contact of said controlling parts with the peripheries of said cams.

20. A system of control of the load distribution of a plurality of energy-transmission units supplying a given system, comprising a common cam shaft, means for rotating said cam shaft in accordance with a condition of said system, individual cams mounted on said cam shaft, the radii of each cam representing ordinates, and the angular positions of said radii being proportional to the logarithms of the slopes corresponding to said ordinates, of the input-output characteristic curve of the respective unit, respective controlling parts engaging with, and movable by the peripheries of said cams as the cam shaft rotates, and means for controlling the inputs of the respective units in accordance with the movements of said controlling parts in such a way as to regulate said condition and to cause the respective units to work on points of their characteristic curves corresponding to the points of contact of said controlling parts with the peripheries of said cams and means whereby the angular position of certain of said cams on said shaft is adjustable.

21. A system of control of the load distribution of a plurality of energy-transmission units supplying a common system, comprising a common element, means for actuating said common element in accordance with a condition of said system, a plurality of sliding contact rheostats each so wound that, if the position of its sliding contact varies as the logarithm of the slope of the input-output characteristic curve of the respective energy-transmission unit, the resistance of said rheostat is a function of an ordinate of said characteristic curve corresponding to said slope, means for actuating said sliding contacts jointly by said common element in such a way that the slopes represented by the positions of said sliding contacts are always the same, and means for controlling the inputs of said energy-transmission units according to the resistances of the respective rheostats in such a way as to regulate said condition and to cause the respective units to work on points of their characteristic curves corresponding to the positions of the respective sliding contacts.

22. A system of control of the load distribution of a plurality of energy-transmission units supplying a common system, comprising a common element, means for actuating said common element in accordance with a condition of said system, a plurality of sliding contact rheostats each so wound that, if the position of its sliding contact varies as the logarithm of the slope of the input-output characteristic curve of the respective energy-transmission unit, the resistance of said rheostat is a function of an ordinate of said characteristic curve corresponding to said slope, means for actuating said sliding contacts jointly by said common element in such a way that the slopes represented by the positions of said sliding contacts are always the same, means for controlling the inputs of said energy-transmission units according to the resistances of the respective rheostats in such a way as to regulate said condition and to cause the respective units to work on points of their characteristic curves corresponding to the positions of the respective sliding contacts, and means whereby the resistance elements of certain of said rheostats are longitudinally adjustable.

23. A system of control of the load distribution of a plurality of energy-transmission units supplying a given system, said units being divided into groups, comprising a group-control element for each group, individual controlling devices for effecting the control of the several units, means whereby the individual controlling devices of each group are actuated jointly by the group-control element of said group in such a way that the units of the group operate to give maximum combined output relative to their combined input, a master control element, means whereby said group control elements are actuated jointly by said master control element in such a way that the several groups, taken as a whole, operate to give maximum combined output relative to their combined input, and means for actuating said master control element in accordance with a condition of the system supplied in such a sense that said condition is regulated.

24. A system of control of the load distribution of a plurality of energy-transmission units supplying a given system, said units being divided into groups, comprising a group-control element for each group, individual controlling devices for effecting the control of the several units, means whereby the individual controlling devices of each group are actuated jointly by the group-control element of said group in such a way that the units of the group operate on points of their characteristic curves which are of the same slope, a master control element, means whereby said group control elements are actuated jointly by said master control element in such a way that the several groups, taken as a whole, operate on points of their group characteristic curves which are of the same slope and means for actuating said master control element in accordance with a condition of the system supplied in such a sense that said condition is regulated.

25. A system of control of the load distribution of a plurality of energy-transmission units supplying a given system, said units being divided into groups, comprising a group-control element for each group, individual controlling devices for effecting the control of the several units, means whereby the individual controlling devices of each group are actuated jointly by the group-control element of said group in such a way that the units of the group operate on points of their characteristic curves which are of the same slope, a master control element, means whereby said group control elements are actuated jointly by said master control element in such a way that the several groups, taken as a whole, operate on points of their group characteristic curves which are of the same slope, means for actuating said master control element in accordance with a condition of the system supplied in such a sense that said condition is regulated, and means located at the region of the master control element for indicating the total output of the whole system.

26. A system of control of the load distribution of a plurality of energy-transmission units supplying a common system, comprising a common element, means for actuating said common element in accordance with a condition of said system, a plurality of sliding contact rheostats each so wound that, if the position of its sliding contact represents the slope of the input-output characteristic curve of the respective energy-transmission unit, the resistance of said rheostat is a function of an ordinate of said characteristic curve corresponding to said slope, means for actuating said sliding contacts jointly by said common element in such a way that the slopes represented by the positions of said sliding contacts are always the same, means for controlling the inputs of said energy-transmission units according to the resistances of the respective rheostats in such a way as to regulate said condition and to cause the respective units to work on points of their characteristic curves corresponding to the positions of the respective sliding contacts, said last named means comprising means for passing a constant current through said rheostats in series and means for controlling the inputs to said energy-transmission units according to the voltage drops across the respective units, and comprising in addition means for measuring the total voltage drop across said rheostats and thereby measuring the total output of the whole system.

27. A system of control of the load distribution of the plurality of groups of energy-transmission units supplying a common system, comprising a master control element, means for actuating said master control element in accordance with a condition of said system, a plurality of sliding contact rheostats each so wound that, if the position of its sliding contact represents the slope of the input-output characteristic curve of the respective group of energy-transmission units taken as a whole, the resistance of said rheostat is a function of an ordinate of said characteristics curve corresponding to said slope, means for actuating said sliding contacts jointly by said master control element in such a way that the slopes represented by the positions of said sliding contacts are always the same, means for controlling the inputs of said groups of energy-transmission units according to the resistances of the respective rheostats in such a way as to regulate said condition and to cause the respective groups of units to work on points of their characteristic curves corresponding to the positions of the respective sliding contacts, said last named means comprising means for passing a constant current through said rheostats in series and means for controlling the inputs to said groups of energy-transmission units according to the voltage drops across the respective units, and means for measuring the total voltage drop across said rheostats and thereby measuring the total output of the whole system.

28. A system of control of the load distribution of a plurality of electrical generator stations supplying a common system, and in which the outputs from the several stations are inter-connected by tie lines, comprising a master control element, means for actuating said master control element according to the frequency in said common system, station controlling devices for effecting control of the inputs of the several stations, and means whereby said station controlling devices are actuated jointly by said master control element in such a way that the frequency in said common system is regulated and said generator stations operate to give maximum combined output relative to their combined input, said last named means comprising compensating means for compensating for the losses in said tie lines between said stations.

29. A system of control of the load distribution of a plurality of electrical generator stations supplying a common system, and in which the outputs from the several stations are inter-connected by tie lines, comprising a master control element, means for actuating said master control element according to the frequency in said common system, a plurality of sliding contact rheostats each so wound that, if the position of its sliding contact represents the slope of the input-output characteristic curve of the respective generator station, the resistance of said rheostat is a function of an ordinate of said characteristic curve corresponding to said slope, primary means for actuating said sliding contacts jointly by said master control element so that, the slopes represented by the positions of said sliding contact are always the same, means for controlling the inputs of said generator stations according to the resistances of the respective rheostats in such a way as to regulate the frequency of said system and to cause the respective generator stations to work on points of their characteristic curves corresponding to the positions of the respective sliding contacts, and secondary means for longitudinally moving the appropriate resistance elements of the rheostats according to the power flowing along the tie lines so as to vary the inputs to the appropriate generator stations to compensate for the losses in said tie lines.

30. A system of control of the load distribution of a plurality of electrical generator stations supplying a common system, and in which the outputs from the several stations are inter-connected by tie lines, comprising a master control element, means for actuating said master control element according to the frequency in said common system, a plurality of sliding contact rheostats each so wound that, if the position of its sliding contact varies as the logarithm of the slope of the input-output characteristic curve of the respective generator station, the resistance of said rheostat is a function of an ordinate of said characteristic curve corresponding to said slope, primary means for actuating said sliding contacts jointly by said master control element so that, the slopes represented by the positions of said sliding contact are always the same, means for controlling the inputs of said generator stations according to the resistances of the respective rheostats in such a way as to regulate the frequency of said system and to cause the respective generator stations to work on points of their characteristic curves corresponding to the positions of the respective sliding contacts, and secondary means for longitudinally moving the appropriate resistance elements of the rheostats according to the power flowing along the tie lines so as to vary the inputs to the appropriate generator stations to compensate for the losses in said tie lines.

31. A system of control of the load distribution of a plurality of electrical generator stations supplying a common system, and in which the outputs from the several stations are inter-connected by tie lines, comprising a master control element, means for actuating said master control element according to the frequency in said common system, station controlling devices for effecting control of the inputs of the several stations, and means whereby said station controlling devices are actuated jointly by said master control element in such a way that the frequency in said common system is regulated and said generator stations operate to give maximum combined output relative to their combined input, said last named means comprising compensating means for compensating for the losses in said tie lines between said stations, and additional means for varying the operation of said compensating means for preventing overloading of said tie lines.

32. A system of control of the load distribution of a plurality of electrical generator stations supplying a common system, and in which the outputs from the several stations are inter-connected by tie lines, comprising a master control element, means for actuating said master control element according to the frequency in said common system, a plurality of sliding contact rheostats each so wound that, if the position of its sliding contact represents the slope of the input-output characteristic curve of the respective generator station, the resistance of said rheostat is a function of an ordinate of said characteristic curve corresponding to said slope, primary means for actuating said sliding contacts jointly by said master control element so that, the slopes represented by the positions of said sliding contact are always the same, means for controlling the inputs of said generator stations according to the resistances of the respective rheostats in such a way as to regulate the frequency of said system and to cause the respective generator stations to work on points of their characteristic curves corresponding to the positions of the respective sliding contacts, secondary means for longitudinally moving the appropriate resistance elements of the rheostats according to the power flowing along the tie lines so as to vary the inputs to the appropriate generator stations to compensate for the losses in said tie lines and tertiary means to modify the action of said secondary means to prevent overloading of said tie lines.

33. A system of control of the load distribution of a plurality of energy-transmission units supplying a given system, comprising a common element, means for actuating said common element in accordance with a condition of said system, individual controlling devices for effecting the control of the several units, primary means whereby said controlling devices are actuated jointly by said common element in such a way that said condition is regulated and said units operate on points of their input-output characteristic curves which are of the same slope, and secondary means for selectively cutting units into and out of use in accordance with variations in the total load in such a way that the maximum combined output relative to the combined input is obtained.

34. A system of control of the load distribution of a plurality of energy-transmission units supplying a given system, comprising a common element, means for actuating said common element in accordance with a condition of said system, individual controlling devices for effecting the control of the several units, primary means whereby said controlling devices are actuated jointly by said common element in such a way that said condition is regulated and said units operate on points of their input-output characteristic curves which are of the same slope, and secondary means for selectively cutting units into and out of use in accordance with variations in the total load in such a way that the maximum combined output relative to the combined input is obtained, said secondary means comprising a first part having a composite surface formed to represent the enveloping curve constituted by the input-output characteristic curves of all the combinations of the units, a second part adapted to move relatively to said first part along said surface according to the total load, the movement being on the same scale as that of the load ordinates of said composite surface, and means for bringing into operation only those units whose combined input-output characteristic curve is represented by the portion of said surface engaged by said second part.

35. A system of control of the load distribution of a plurality of energy-transmission units supplying a given system, comprising a common element, means for actuating said common element in accordance with a condition of said system, individual controlling devices for effecting the control of the several units, primary means whereby said controlling devices are actuated jointly by said common element in such a way that said condition is regulated and said units operate on points of their input-output characteristic curves which are of the same slope, and secondary means for selectively cutting units into and out of use in accordance with variations in the total load in such a way that the maximum combined output relative to the combined input is obtained, said secondary means comprising a first part having a composite surface formed to represent the enveloping curve constituted by the input-output characteristic curves of all the combinations of the units, a second part adapted to move relatively to said first part along said surface according to the total load, the movement being on the same scale as that of the load ordinates of said composite surface, and means for bringing into operation only those units whose combined input-output characteristic curve is represented by the portion of said surface engaged by said second part, said last named means, when said second part engages the junction of two portions of said surface bringing into operation only those units whose combined input-output characteristic curve is represented by one of said portions.

PAUL GEORGE KAUFMANN.